C. S. SIGHTS.
INNER TUBE FOR TIRES.
APPLICATION FILED JAN. 30, 1919.
1,368,063.
Patented Feb. 8, 1921.
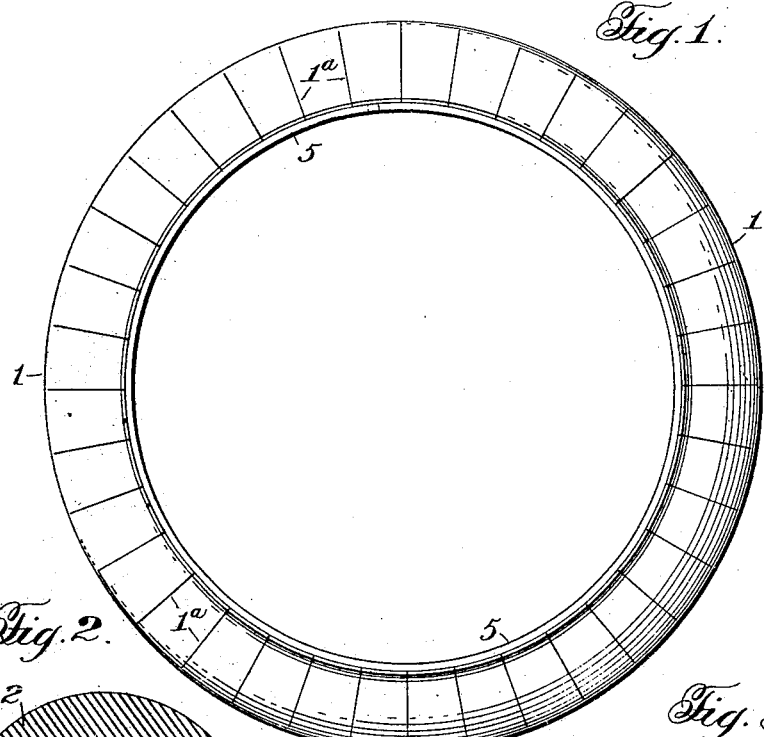
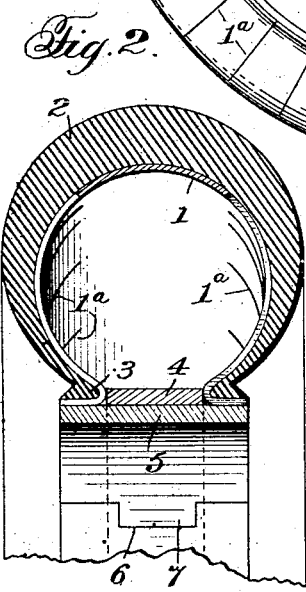
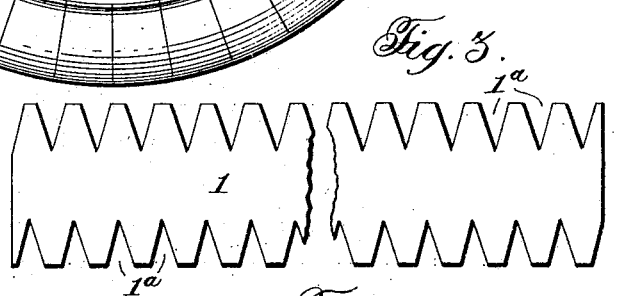
Witnesses:
Jas E Hitchinson
Inventor
Casper Stanley Sights,
By Miland & Miland Attorneys

UNITED STATES PATENT OFFICE.

CASPER STANLEY SIGHTS, OF LA HARPE, ILLINOIS.

INNER TUBE FOR TIRES.

1,368,063.          Specification of Letters Patent.      Patented Feb. 8, 1921.

Application filed January 30, 1919. Serial No. 274,120.

*To all whom it may concern:*

Be it known that I, CASPER S. SIGHTS, a citizen of the United States, residing at La Harpe, in the county of Hancock and State of Illinois, have invented a certain new and useful Improvement in Inner Tubes for Tires, of which the following is a specification, reference being had therein to the accompanying drawing.

This invention relates to inner tubes for tires, and it is one of the primary objects of the invention to provide an inner tube which is not only puncture-proof, but of wear-resisting properties, and sufficiently yieldable to allow the tire to give, and otherwise perform as nearly as possible the functions of the usual rubber inner tube.

Many experiments have heretofore been tried out with armor reinforce members for tire shoes, but these are usually of a character to be embedded in the shoe, thereby making necessary a shoe of peculiar make-up or construction, and it is contemplated by the present invention to provide a reinforce entirely separate and distinct from the tire shoe and readily applicable and removable at will from the tire shoe, and the reinforce being of a construction adapted to accommodate itself to shoes of standard construction, without changing the design or configuration of the latter.

Again, it is the purpose of the invention to provide a metallic reinforce for the shoe readily applicable to the inner surface thereof, and which said reinforce at the same time takes the form and answers the necessary purposes of an inner tube for the shoe.

Still further, the invention includes a metallic reinforce for tire shoes of improved construction, whereby to impart the necessary rigidity to the shoe to prevent undue collapsing of the latter, and associated means whereby to permit the necessary yieldability of the shoe relative to the wheel to which the same is applied.

More particularly, the invention includes a reinforce member of yieldable metal adapted to conform generally to the inner surface of a tire shoe, and means associated with said member whereby to support the reinforce in place under constant spring pressure on the tire shoe.

Still other and further improvements, and novel details in construction and arrangement of parts will be appreciated from the description to follow, which for a clear understanding of the invention, is to be considered in connection with the accompanying drawing forming a part hereof, and wherein is disclosed for the purposes of illustration a convenient and satisfactory embodiment of the invention, though in this connection it is to be borne in mind that minor changes in details of construction may be resorted to without departing from the spirit of the invention.

In the drawings,

Figure 1 is a side elevation of an inner tube constructed in accordance with my invention.

Fig. 2 is a cross section of the inner tube applied to an outer shoe of a tire.

Figs. 3, 4 and 5 are detail views reduced of the inner tube parts removed and previous to bending into shape.

With more particular reference to the drawings, wherein like reference numerals refer to corresponding parts throughout the several views, 1 is a metallic reinforcing member, the same being formed from an elongated sheet of metal the opposite edges of which have cutout parts $1^a$ preferably V-shape, and arranged in staggered relation, the said strip being adapted to be rolled upon itself both longitudinally and transversely, from the form illustrated in Fig. 3 to that illustrated in Figs. 1 and 2, when the cutout parts $1^a$ will be substantially closed, and whereby a substantially continuous U-shaped member is provided corresponding to the inner surface of the ordinary outer shoe 2 of a tire. The extreme opposite edges of the member 1 will be outwardly turned whereby to engage under and conform to the outwardly curved parts 3 at the base of the tire shoe. The member 1 is preferably loosely applied to the inner surface whereby the same may be removed at will and reassembled on another shoe as desired. A suitable metallic spacing ring 4 is conveniently provided, the same being preferably continuous and adapted to engage between the side walls of the member 1 whereby to constitute a divider and maintain opposite sides of the member 1 in spaced position and against lateral collapse. In order to firmly maintain the reinforcing member 1 in place, as well as to impart the necessary rigiditiy thereto, while permitting yieldability, there is provided a base for the tube as seen at 5, which also constitutes a closure for the inner tube. This base or inner member 5 of the tube is likewise formed of sheet metal, and it is proposed to apply the same under considerable pressure, say several hundred pounds, whereby to give the reinforcing member its strength. The inner member 5 is provided at one end with a receiving aperture or recess 6 and at its opposite end with a retaining or locking lug 7, which, as the member 5 is expanded under pressure, will engage in the recess 6 and lock the parts in place.

It will be observed that the inner member 5 will conform to the periphery of the ordinary motor car wheel, and is of a width to underlie the offset terminals of the sides of the reinforcing member 1 thereby giving to the latter its necessary strength.

The various parts of the inner tube as thus described are preferably formed from spring steel, and when in place the inner flat spring member 5 presses the sides of the outer member 1 against the divider 4, and the more pressure, the tighter the sides come together, which prevents them from slipping. When the metallic inner tube is in place in the outer shoe, it is understood to take the place of the usual rubber inner tube, and the tire may be applied to the wheel in the usual manner, and secured by the usual retaining means of standard construction.

Having thus described the invention, what I claim is:

1. A metallic reinforce for tires comprising an elongated strip notched at opposite sides and curved longitudinally and transversely whereby to conform to the inner surface of the outer shoe of a tire with the notched edges disposed at the base of said shoe, a metallic divider of independent construction comprising an annular strip within said curved member to separate opposite sides thereof, and a metallic band forming a base for the said member adapted to engage the notched edge portions thereof.

2. In a metallic inner tube for tires, the combination of a substantially U-shaped member in cross section, of spring metal adapted to conform to the inner surface of a tire shoe, an annular dividing strip arranged in the space between the sides of the U-shaped member to maintain the latter properly spaced and a metallic band free from connection with said U-shaped member and forming an inner wall for the tube.

3. In a metallic inner tube for tires, the combination of a substantially U-shaped member in cross section of spring metal adapted to conform to the inner surface of a tire shoe, a metallic band forming an inner wall for the tube, and a metallic divider free from connection with, and arranged between said band and the tread portion of the tube.

4. In a metallic inner tube for tires, the combination of a substantially U-shaped member adapted to engage the inner surface of an outer shoe, the tread portion of said member being substantially smooth and continuous, and the opposite sides thereof having a series of closely associated substantially V-shaped recesses arranged in staggered relation at opposite sides of the member, the recessed edges adapted to underlie the sides of the shoe, and a metallic band adapted to rest upon a wheel and engaging said recessed edges under expansion.

5. In a metallic inner tube for tires, the combination of a substantially U-shaped member adapted to engage the inner surface of an outer shoe, the tread portion of said member being substantially smooth and continuous, and the opposite sides thereof having a series of closely associated substantially V-shaped recesses arranged in staggered relation at opposite sides of the member, the recessed edges adapted to underlie the sides of the shoe, a metallic band adapted to rest upon a wheel and engaging said recessed edges under pressure, and an internal reinforce for said tube.

6. A metallic inner tube comprising a substantially U-shaped metal strip adapted to conform to the inner surface of an outer tire, and means engaging opposite sides of said inner tube under constant spring pressure.

7. In combination with an outer shoe of an inner tire tube comprising a rim part and a substantially U-shaped member, the opposite sides of which engage said rim part, a reinforcing and dividing metal ring disposed between the sides of the U-shaped member outward of the base thereof, and means engaging opposite sides of the inner tube under constant spring pressure.

8. A detachable inner tube for tires formed completely of metal and comprising a metal strip substantially U-shaped in cross section, an independent annular metal band arranged between the sides of said strip, and an auxiliary annular metal band constituting a base for the inner tube and engaging the sides of the U-shaped strip at the base thereof under constant spring pressure.

9. A detachable inner tube for tires formed completely of metal and comprising an outer metal strip of substantially U-shaped cross section adapted to conform to the inner surface of the usual outer shoe, and an auxiliary annular metal band constituting a base for the inner tube and engaging the sides of the U-shaped strip at the base thereof under constant spring pressure.

In testimony whereof I hereunto affix my signature in the presence of two witnesses.

CASPER STANLEY SIGHTS.

Witnesses:
 FRED RANDALL,
 F. A. WILKINSON.